United States Patent
Kamoshida

(10) Patent No.: US 11,294,630 B2
(45) Date of Patent: Apr. 5, 2022

(54) ADDER-SUBTRACTOR CIRCUIT AND METHOD OF CONTROLLING ADDER-SUBTRACTOR CIRCUIT

(71) Applicant: FUJITSU LIMITED, Kawasaki (JP)

(72) Inventor: Shiro Kamoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 188 days.

(21) Appl. No.: 16/392,775

(22) Filed: Apr. 24, 2019

(65) Prior Publication Data

US 2019/0339940 A1  Nov. 7, 2019

(30) Foreign Application Priority Data

May 1, 2018  (JP) .............................. JP2018-088370

(51) Int. Cl.
  *G06F 7/503* (2006.01)
  *G06F 7/505* (2006.01)
  *G06F 7/575* (2006.01)

(52) U.S. Cl.
  CPC .............. *G06F 7/503* (2013.01); *G06F 7/505* (2013.01); *G06F 7/575* (2013.01)

(58) Field of Classification Search
  CPC . G06F 7/50; G06F 7/503; G06F 7/505; G06F 7/506; G06F 7/508; G06F 7/509; G06F 7/575
  See application file for complete search history.

(56) References Cited

U.S. PATENT DOCUMENTS

| 5,206,827 A | 4/1993 | Tsuruta | |
|---|---|---|---|
| 7,274,211 B1* | 9/2007 | Simkins | H03K 19/17728 326/38 |
| 7,991,820 B1* | 8/2011 | Sohay | G06F 7/505 708/700 |
| 2005/0198094 A1* | 9/2005 | Wallace | G06F 7/506 708/700 |
| 2016/0350075 A1* | 12/2016 | Kimura | G06F 7/575 |

FOREIGN PATENT DOCUMENTS

| JP | 4-218831 | 8/1992 |
|---|---|---|
| JP | 4-280319 | 10/1992 |
| JP | 2016-224596 | 12/2016 |

OTHER PUBLICATIONS

Patent Abstracts of Japan English abstract for Japanese Patent Publication No. 4-280319, published Oct. 6, 1992.
Patent Abstracts of Japan English abstract for Japanese Patent Publication No. 4-218831, published Aug. 10, 1992.
Patent Abstracts of Japan English abstract for Japanese Patent Publication No. 2016-224596, published Dec. 28, 2016.

* cited by examiner

*Primary Examiner* — Emily E Larocque
(74) *Attorney, Agent, or Firm* — Staas & Halsey, LLP

(57) ABSTRACT

An adder-subtractor circuit includes an inverting circuit configured to invert a first operand on a bit-by-bit basis to output a first inverted operand, a circuit having a function to perform a predetermined arithmetic operation and configured to output a second operand, a carry generating circuit configured to generate carries from the first inverted operand and the second operand, and an XOR circuit configured to perform a bit-by-bit XOR on the carries, the first operand, and the second operand.

5 Claims, 10 Drawing Sheets

ADDER-SUBTRACTOR CIRCUIT AND METHOD OF CONTROLLING ADDER-SUBTRACTOR CIRCUIT

CROSS-REFERENCE TO RELATED APPLICATIONS

The present application is based upon and claims the benefit of priority from the prior Japanese Patent Application No. 2018-088370 filed on May 1, 2018, with the Japanese Patent Office, the entire contents of which are incorporated herein by reference.

FIELD

The disclosures herein relate to an adder-subtractor circuit and a method of controlling an adder-subtractor circuit.

BACKGROUND

The operating frequency of the processor is determined by the length of delay (i.e., delay time) of the path (i.e., critical path) that has a maximum delay among all the paths existing between registers. Moving a circuit present in the maximum-delay path to a path with a relatively small delay may even out the delays of paths, thereby improving the operating frequency. The path delay of a fixed-point adder circuit is often a factor that determines the processor's operating frequency for the following reasons, and an act of evening out the path delays in the adder circuit directly leads to improved processor operating speed.

In order to perform the subtraction of "OP1-OP2" on a first operand OP1 and a second operand OP2, an adder of the processor typically performs the operation of "OP1+~OP2+1". The notation "~OP2" is the 1's complement of OP2, i.e., the value that is a bit-by-bit inversion of OP2. In the adder-subtractor circuit having this configuration, an inverting circuit for performing a bit-by-bit inversion is provided in the path for OP2, which ends up increasing the delay of the path for OP2. Further, an architecture for a typical instruction set tends to have an additional circuit on the OP2 path for performing additional functions such as code extension, zero extension, bit shift, etc. Due to the presence of such a circuit, the OP2 path becomes a critical path having a maximum delay.

In order to reduce a delay on the OP2 path, technology has been developed in which an inverting circuit for the OP2 path is provided on the OP1 path (see Patent Document 1 and Patent Document 2, for example). However, this technology has the problem that the overall path delay is not improved.

PRIOR ART DOCUMENT

[Patent Document]
[Patent Document 1] Japanese Laid-open Patent Publication No. H4-280319
[Patent Document 2] Japanese Laid-open Patent Publication No. H4-218831
[Patent Document 3] Japanese Laid-open Patent Publication No. 2016-224596

SUMMARY

According to an aspect of the embodiment, an adder-subtractor circuit includes an inverting circuit configured to invert a first operand on a bit-by-bit basis to output a first inverted operand, a circuit having a function to perform a predetermined arithmetic operation and configured to output a second operand, a carry generating circuit configured to generate carries from the first inverted operand and the second operand, and an XOR circuit configured to perform a bit-by-bit XOR on the carries, the first operand, and the second operand.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
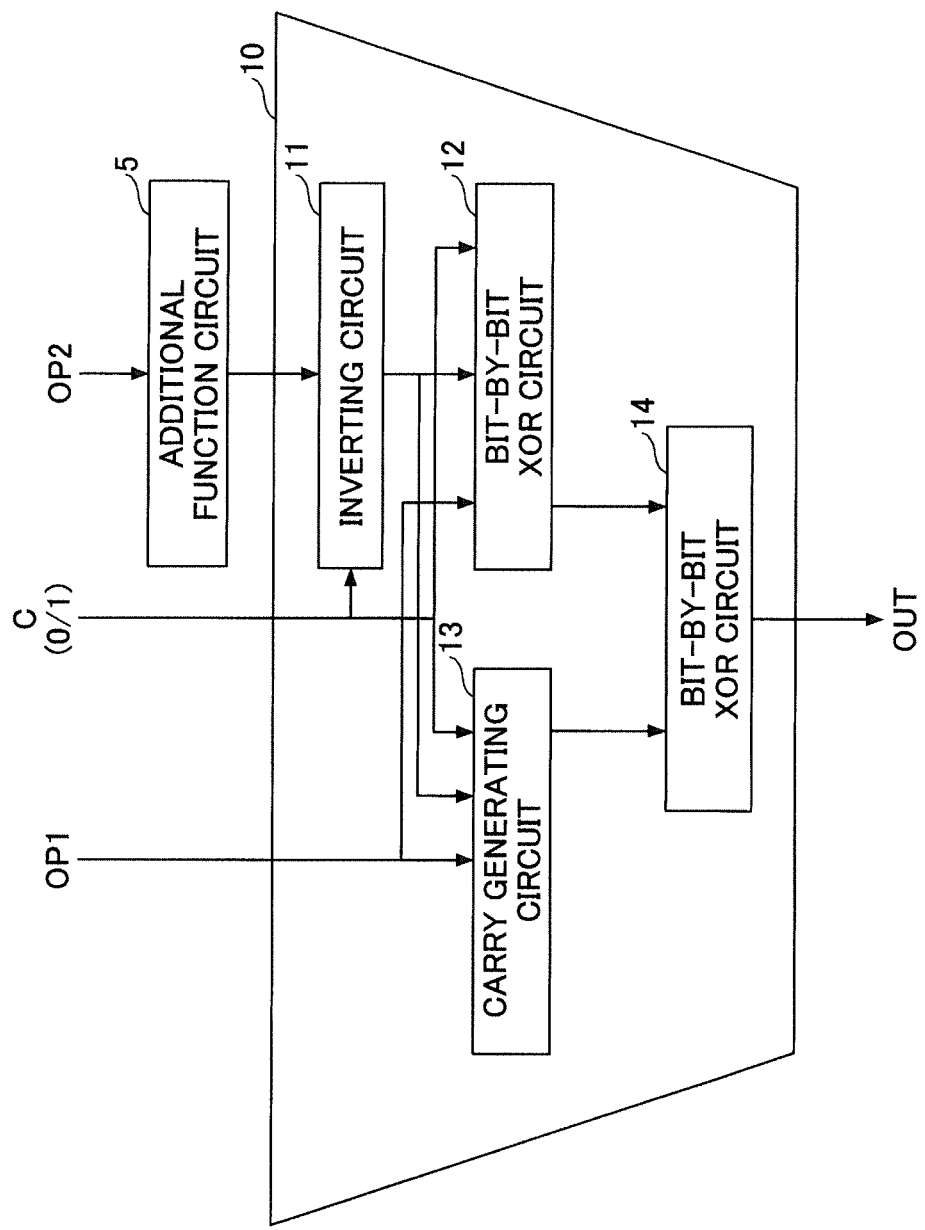
FIG. 1 is a diagram illustrating an example of the configuration of an adder-subtractor circuit.

In the drawings that will be described in the following, the same or similar elements are referred to by the same or similar reference numerals, and a description thereof may be omitted.

FIG. 1 is a diagram illustrating an example of the configuration of an adder-subtractor circuit. With reference to FIG. 1, the configuration of a conventional adder-subtractor circuit will be described. The adder-subtractor circuit illustrated in FIG. 1 includes an additional function circuit 5 and an adder-subtractor 10. The adder-subtractor 10 includes an inverting circuit 11, a bit-by-bit XOR circuit 12, a carry generating circuit 13, and a bit-by-bit XOR circuit 14.

The adder-subtractor 10 performs addition or subtraction with respect to a first operand OP1 and a second operand OP2. In the addition operation, a control signal C is set to 0, and in the subtraction operation, the control signal C is set to 1.

In the addition operation, the control signal C is set to 0, so that the inverting circuit 11 does not perform an inversion and the second operand OP2 is supplied to the bit-by-bit XOR circuit 12 and to the carry generating circuit 13. The first operand OP1 is also supplied to the bit-by-bit XOR circuit 12 and to the carry generating circuit 13.

The carry generating circuit 13 is a carry generating portion of a CLA (Carry Look-Ahead Adder), and generates carries (carry signals) having a value of 0 or 1 for each bit based on the first operand OP1 and the second operand OP2. The bit-by-bit XOR circuit 12 outputs a first arithmetic value obtained by performing a bit-by-bit XOR (exclusive logical OR) on the first operand OP1 and the second operand OP2. The bit-by-bit XOR circuit 14 outputs the result of addition obtained by performing a bit-by-bit XOR between the carries and the first arithmetic value. Use of the carry generating circuit 13 to generate carries based on the carry look-ahead scheme allows a high-speed addition operation to be performed, without the need for successive propagation of carries from the lower-order bits to the higher-order bits.

In the subtraction operation, the control signal C is set to 1, so that the inverting circuit 11 performs a bit-by-bit inversion to generate a bit-by-bit inverted value ~OP2 (i.e., one's complement of OP2) from the second operand OP2. Here, the operator "~" represents a bit-by-bit inversion. The second inverted operand ~OP2 is supplied to the bit-by-bit XOR circuit 12 and to the carry generating circuit 13. The first operand is also supplied to the bit-by-bit XOR circuit 12 and to the carry generating circuit 13. The value "1" of the control signal C is also supplied to the bit-by-bit XOR circuit 12 and to the carry generating circuit 13.

The bit-by-bit XOR circuit 12, the carry generating circuit 13, and the bit-by-bit XOR circuit 14 perform an addition operation on the first operand OP1 and the second inverted operand ~OP2 similarly to the manner in which the previously-described addition operation is performed, followed by adding "1" to the least significant bit. With this arrangement, "OP1+~OP2+1" is calculated. Since ~OP2+1=−OP2, the subtraction process of "OP1−OP2" is realized by this calculation.

In the adder-subtractor circuit illustrated in FIG. 1, the additional function circuit 5 is provided that has a function to perform a predetermined arithmetic operation to output a second operand. One example of the logical operation performed by the additional function circuit 5 is the process of modifying the second operand OP2 when adding the second operand OP2 serving as an offset to the first operand OP1 serving as a base address in the address calculation for memory access. When the operand data size is 64 bits long, for example, sign extension or zero extension may be performed for the second operand OP2 when an integer value represented by a smaller number of bits than 64 bits is modified to the 64-bit data size. Further, the second operand OP2 serving as an offset in address calculation may be subjected to a left-shift operation after extension processing. When the operand is 64 bits long, the additional function circuit 5 typically has a circuit configuration comprised of approximately 5 logic-gate stages.

Functions provided by the additional function circuit 5 are not limited to those examples. For example, additional functions such as a right shift operation and a rotate operation may be provided in the additional function circuit 5.

In the adder-subtractor circuit illustrated in FIG. 1, the additional function circuit 5 and the inverting circuit 11 are provided in the path for the second operand OP2, which thus ends up having a larger delay than the path for the first operand OP1. This large delay of the path for the second operand OP2 makes it difficult to increase the operating frequency of the adder-subtractor circuit for the purpose of achieving high-speed operation.

Figure 2:
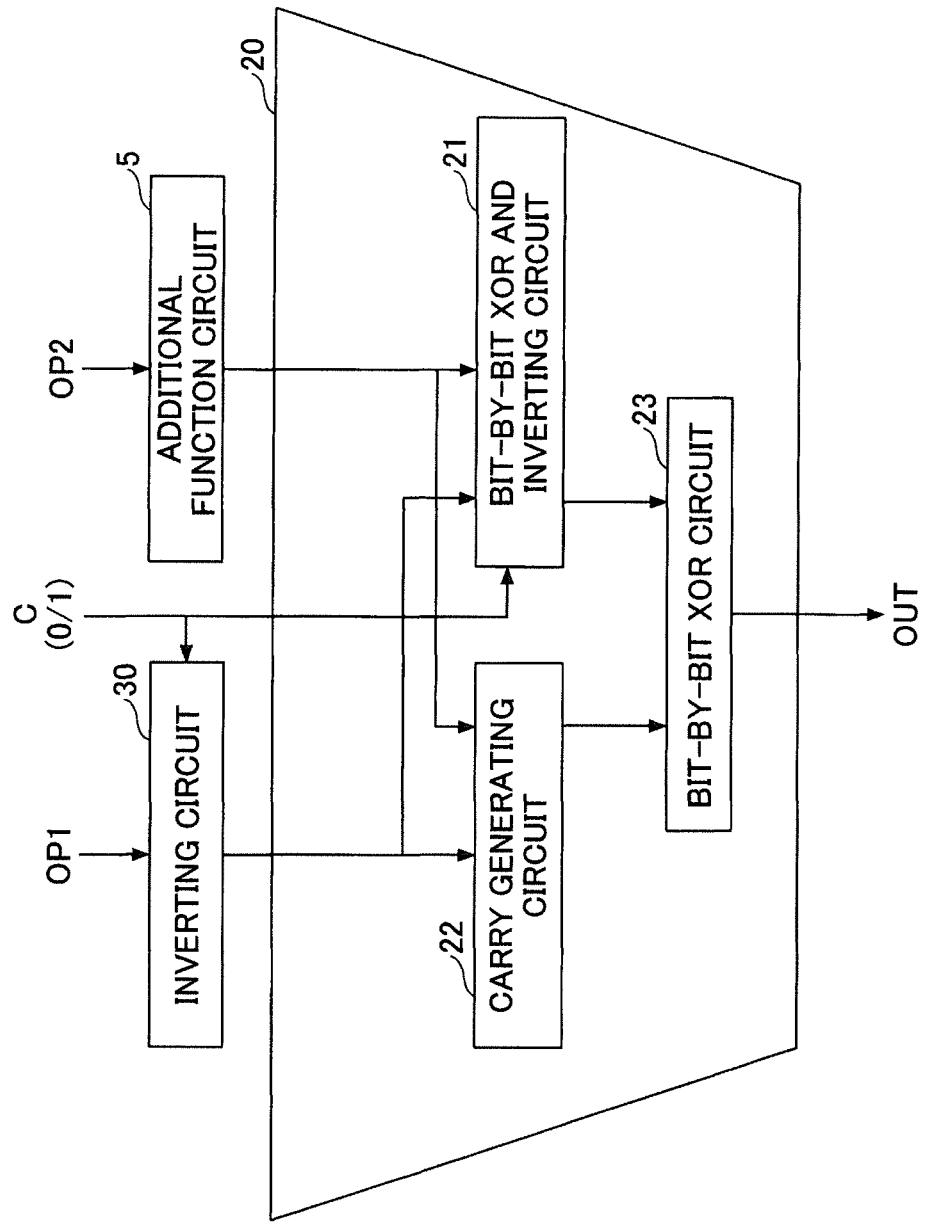
FIG. 2 is a diagram illustrating the configuration of a first embodiment of an adder-subtractor circuit.

FIG. 2 is a diagram illustrating the configuration of a first embodiment of an adder-subtractor circuit. The adder-subtractor circuit illustrated in FIG. 2 includes the additional function circuit 5, an adder-subtractor 20, and an inverting circuit 30. The adder-subtractor 20 includes a bit-by-bit XOR and inverting circuit 21, a carry generating circuit 22, and a bit-by-bit XOR circuit 23.

In FIG. 2 and the subsequent drawings, boundaries between circuit blocks illustrated as boxes basically indicate functional boundaries, and may not correspond to separation in terms of physical positions, separation in terms of electrical signals, separation in terms of control logic, etc. Each circuit block may be a circuit module that is physically separated from other circuit blocks to some extent, or may indicate a function in a circuit module in which this and other circuit blocks are physically combined together. For example, the inverting circuit 30 may be included within adder-subtractor 20. Further, an inversion operation in the bit-by-bit XOR and inverting circuit 21, for example, may be realized by an XOR operation between data to be inverted and data whose bits are all "1"s. That is, all the operations by the bit-by-bit XOR and inverting circuit 21 are realized by an XOR operation, so that both the bit-by-bit XOR circuit 23 and the bit-by-bit XOR and inverting circuit 21 are implemented as circuits that execute a bit-by-bit XOR operation. In this case, a 4-input XOR gate may be used to perform a bit-by-bit XOR with respect to 4 data items, i.e., two data items input into the bit-by-bit XOR and inverting circuit 21, the data whose bits are all "1"s, and the carries output from the carry generating circuit 22.

The additional function circuit 5 is the same circuit as the additional function circuit 5 described in FIG. 1. The additional function circuit 5 has the function to perform a predetermined arithmetic operation, and outputs the second operand OP2 after performing the predetermined arithmetic operation as needed.

The adder-subtractor 20 performs addition or subtraction with respect to the first operand OP1 and the second operand OP2. In the addition operation, the control signal C is set to 0, and in the subtraction operation, the control signal C is set to 1. The control signal C is also applied to the inverting circuit 30. When the control signal C is 0, the inverting circuit 30 outputs the first operand OP1 as it is. When the control signal C is 1, the inverting circuit 30 performs a bit-by-bit inversion on the first operand OP1 to output the first inverted operand ~OP1.

In the addition operation, the control signal C is set to 0, so that the bit-by-bit XOR and inverting circuit 21 outputs a first arithmetic value obtained by performing a bit-by-bit XOR between the first operand OP1 and the second operand OP2. When the control signal C is 0, an inverting operation is not performed in the bit-by-bit XOR and inverting circuit 21.

The carry generating circuit 22 is a carry generating portion of the CLA, and generates carries (i.e., carry signals) having a value of 0 or 1 for each bit based on the first operand OP1 and the second operand OP2. The bit-by-bit XOR circuit 23 outputs the result of addition obtained by performing a bit-by-bit XOR between the carries and the first arithmetic value. Use of the carry generating circuit 22 to generate carries based on the carry look-ahead scheme allows a high-speed addition operation to be performed, without the need for successive propagation of carries from the lower-order bits to the higher-order bits.

In the subtraction operation, the control signal C is set to 1, so that the bit-by-bit XOR and inverting circuit 21 outputs a first arithmetic value obtained by performing a bit-by-bit inversion on a result of performing a bit-by-bit XOR between the first inverted operand ~OP1 and the second operand OP2. In this manner, when the control signal C is 1, an inverting operation is performed in the bit-by-bit XOR and inverting circuit 21.

The carry generating circuit 22 is a carry generating portion of the CLA, and generates carries (i.e., carry signals) having a value of 0 or 1 for each bit based on the first inverted operand ~OP1 and the second operand OP2. The bit-by-bit XOR circuit 23 outputs the result of subtraction obtained by performing a bit-by-bit XOR between the carries and the first arithmetic value. Use of the carry generating circuit 22 to generate carries based on the carry look-ahead scheme allows a high-speed addition operation to be performed, without the need for successive propagation of carries from the lower-order bits to the higher-order bits.

In the following, how the subtraction result of "OP1-OP2" is obtained by the above-described operation will be described.

The first arithmetic value output from the bit-by-bit XOR and inverting circuit 21 is a bit-by-bit inversion of the value obtained by performing a bit-by-bit XOR between the first inverted operand ~OP1 and the second operand OP2. Here, a bit-by-bit inversion can be represented as a bit-by-bit XOR performed between the data to be inverted and data whose bits are all "1"s (denoted as ALL1). Accordingly, when the carries (i.e., outputs of the carry generating circuit 13) of the addition operation between the first inverted operand ~OP1 and the second operand OP2 are denoted as CR, an output OUT of the bit-by-bit XOR circuit 23 is represented as follows.

$$OUT = CR \wedge (\sim OP1 \wedge OP2 \wedge ALL1)$$

Here, the operator "∧" represents a bit-by-bit XOR. Because the associative law holds for the XOR operation, the above-noted equation representing the output OUT can be modified as follows.

$$OUT = CR \wedge (\sim OP1 \wedge OP2 \wedge ALL1) = (CR \wedge \sim OP1 \wedge OP2) \wedge$$
$$ALL1 = \sim (CR \wedge \sim OP1 \wedge OP2) = \sim(\sim OP1 + OP2)$$

Here, with "~X=ALL1−X=(ALL1+1)−X−1=−X−1" being taken into account, the output OUT can be modified as follows.

$$OUT = \sim(\sim OP1 + OP2) = -(\sim OP1 + OP2) - 1 =$$
$$-(\sim OP1) - OP2 - 1 = -(-OP1 - 1) - OP2 - 1 = OP1 - OP2$$

Accordingly, in the case of the subtraction operation for which the control signal C is set to 1, the output of the adder-subtractor 20 illustrated in FIG. 2 is equal to the value obtained by subtracting the second operand OP2 from the first operand OP1.

In the configuration of FIG. 2, the side on which an XOR is performed, i.e., the side on which the bit-by-bit XOR and inverting circuit 21 is situated, is characterized in that a value "~OP1^ OP2^ALL1" is calculated by inverting a bit-by-bit XOR between the first inverted operand ~OP' and the second operand OP2. Here, the following equation may further be noted.

$$\sim OP1 \wedge OP2 \wedge ALL1 = OP1 \wedge OP2$$

Because of the above-noted equation, the side on which an XOR is performed, i.e., the side on which the bit-by-bit XOR and inverting circuit 21 is situated, is characterized such that a bit-by-bit XOR is performed on the first operand OP1 and the second operand OP2. When the operation of the bit-by-bit XOR and inverting circuit 21 and the operation of the bit-by-bit XOR circuit 23 are combined, the resulting operation is equivalent to the calculation of a bit-by-bit XOR between the carries, the first operand OP1, and and the second operand OP2. However, on the side on which carries are generated, i.e., on the side on which the carry generating circuit 22 is situated, carries are generated between the first inverted operand ~OP1 and the second operand OP2.

As described above, the adder-subtractor circuit illustrated in FIG. 2 uses the carry generating circuit 22 to generate carries from the first inverted operand ~OP1 and the second operand OP2. The XOR circuit (21+23) then performs a bit-by-bit XOR between the carries, the first operand OP1, and the second operand OP2.

In the adder-subtractor circuit of the first embodiment illustrated in FIG. 2, the inverting circuit 30 is moved to the first operand OP1 side as compared with the conventional adder-subtractor circuit illustrated in FIG. 1, in which the inverting circuit 11 is disposed on the second operand OP2 side. When the first operand OP1 side and the second operand OP2 side are compared in this configuration, the path delay is reduced on the second operand OP2 side, which is conventionally a critical path. As may be noted, a bit-by-bit inversion that is non-existent in the conventional adder-subtractor circuit illustrated in FIG. 1 is performed in the bit-by-bit XOR and inverting circuit 21 in the adder-subtractor circuit of the first embodiment illustrated in FIG. 2. However, this inversion operation is executed in parallel with the operation of the carry generating circuit 22. Accordingly, the inversion operation in the bit-by-bit XOR and inverting circuit 21 is performed during the carry generating process by the carry generating circuit 22, and is thus not a factor that increases the delay when considering the path delay from the input to the output of the adder-subtractor 20. In this manner, the adder-subtractor circuit of the first embodiment illustrated in FIG. 2 achieves a reduced path delay in the configuration in which an additional function is provided to perform a predetermined arithmetic operation on one of the two operands.

Figure 3:
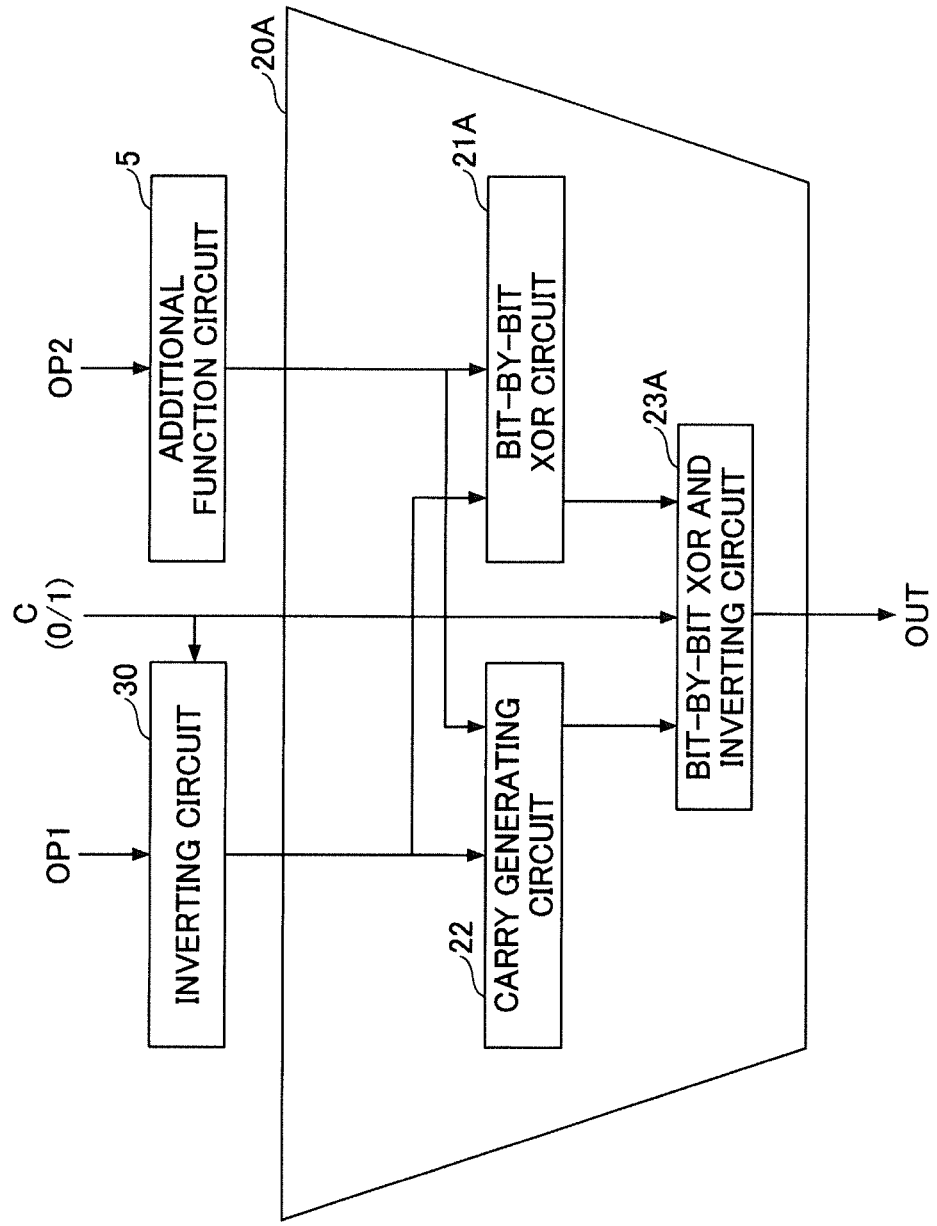
FIG. 3 is a diagram illustrating the configuration of a second embodiment of an adder-subtractor circuit.

FIG. 3 is a diagram illustrating the configuration of a second embodiment of an adder-subtractor circuit. The adder-subtractor circuit illustrated in FIG. 3 includes the additional function circuit 5, an adder-subtractor 20A, and the inverting circuit 30. The adder-subtractor 20A includes a bit-by-bit XOR circuit 21A, a carry generating circuit 22, and a bit-by-bit XOR and inverting circuit 23A.

In the adder-subtractor circuit of the first embodiment illustrated in FIG. 2, the inverting function of the bit-by-bit XOR side is provided in the bit-by-bit XOR and inverting circuit 21, whereas in the adder-subtractor circuit of the second embodiment illustrated in FIG. 3, the inverting function of the bit-by-bit XOR side is provided in the bit-by-bit XOR circuit 23. Other than this, there is no difference between the adder-subtractor circuit of the second embodiment and the adder-subtractor circuit of the first embodiment.

In the addition operation, the control signal C is set to 0, so that the bit-by-bit XOR circuit 21A outputs a first arithmetic value obtained by performing a bit-by-bit XOR between the first operand OP1 and the second operand OP2. The carry generating circuit 22 generates carries having a value of 0 or 1 for each bit based on the first operand OP1 and the second operand OP2. The bit-by-bit XOR and inverting circuit 23A outputs the result of addition obtained by performing a bit-by-bit XOR between the first arithmetic value and the carries. When the control signal C is 0, an inverting operation is not performed in the bit-by-bit XOR and inverting circuit 23A.

In the subtraction operation, the control signal C is set to 1, so that the bit-by-bit XOR circuit 21A outputs a first computed value obtained by performing a bit-by-bit XOR between the first inverted operand ~OP1 and the second operand OP2. The carry generating circuit 22 generates carries having a value of 0 or 1 for each bit based on the first inverted operand ~OP1 and second operand OP2. The bit-by-bit XOR and inverting circuit 23A outputs the result of subtraction obtained by performing a bit-by-bit inversion on the result of performing a bit-by-bit XOR between the first arithmetic value and the carries. When the control signal C is 1, an inverting operation is performed in the bit-by-bit XOR and inverting circuit 23A.

In the configuration of FIG. 3, when the operation of the bit-by-bit XOR circuit 21A and the operation of the bit-by-bit XOR and inverting circuit 23A are combined, the resulting operation is equivalent to the calculation of a bit-by-bit XOR between the carries, the first operand OP1, and the second operand OP2. However, on the side on which carries are generated, i.e., on the side on which the carry generating circuit 22 is situated, carries are generated between the first inverted operand ~OP1 and the second operand OP2.

As described above, the adder-subtractor circuit illustrated in FIG. 3 uses the carry generating circuit 22 to generate carries from the first inverted operand ~OP1 and the second operand OP2. The XOR circuit (21A+23A) then performs a bit-by-bit XOR on the carries, the first operand OP1, and the second operand OP2. Accordingly, as in the first embodiment, the subtraction result of "OP1-OP2" is duly output.

In the adder-subtractor circuit of the second embodiment illustrated in FIG. 3, the inverting circuit 30 is moved to the first operand OP1 side as compared with the conventional adder-subtractor circuit illustrated in FIG. 1, in which the inverting circuit 11 is disposed on the second operand OP2 side. When the first operand OP1 side and the second operand OP2 side are compared in this configuration, the path delay is reduced on the second operand OP2 side, which is conventionally a critical path. As may be noted, a bit-by-bit inversion that is non-existent in the conventional adder-subtractor circuit illustrated in FIG. 1 is performed in the bit-by-bit XOR and inverting circuit 23A in the adder-subtractor circuit of the second embodiment illustrated in FIG. 3. However, this inversion operation can be executed as an XOR operation. As will be described later, an XOR gate may be implemented as a logic circuit comprised of two transistor stages regardless of the number of inputs, whether the XOR operation involves two inputs, or involves three inputs. Accordingly, with the use of an XOR gate having an appropriate circuit configuration, an inversion operation in the bit-by-bit XOR and inverting circuit 23A is not a factor that increases the amount of delay as measured in terms of the number of transistor stages. In this manner, the adder-subtractor circuit of the second embodiment illustrated in FIG. 3 achieves a reduced path delay in the configuration in which an additional function is provided to perform a predetermined arithmetic operation on one of the two operands.

Figure 4:
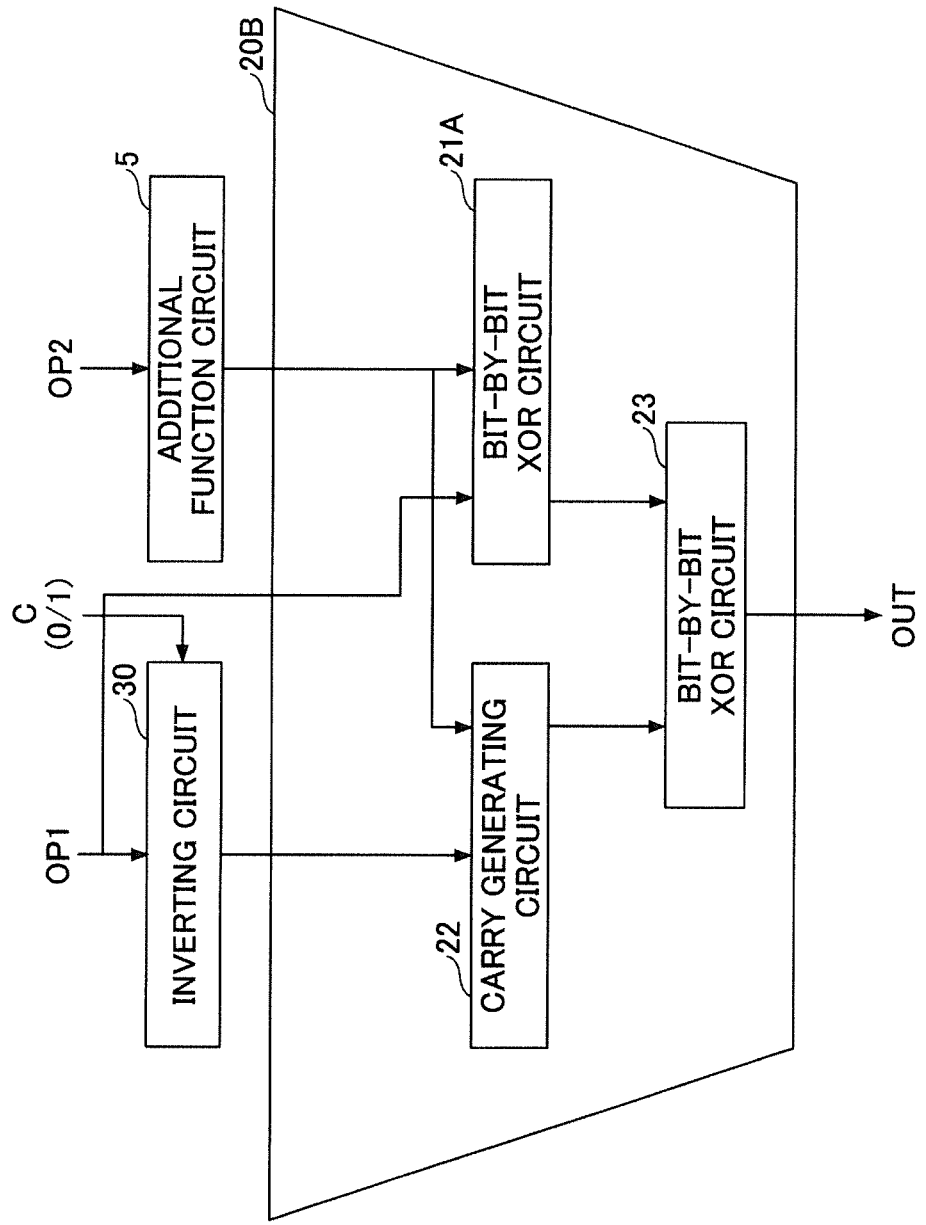
FIG. 4 is a diagram illustrating the configuration of a third embodiment of an adder-subtractor circuit.

FIG. 4 is a diagram illustrating the configuration of a third embodiment of an adder-subtractor circuit. The adder-subtractor circuit illustrated in FIG. 4 includes the additional function circuit 5, an adder-subtractor 203, and the inverting circuit 30. The adder-subtractor 203 includes a bit-by-bit XOR circuit 21A, the carry generating circuit 22, and the bit-by-bit XOR circuit 23.

In the adder-subtractor circuit of the first embodiment illustrated in FIG. 2, the first inverted operand ~OP1 generated by the inverting circuit 30 is supplied to the bit-by-bit XOR and inverting circuit 21. In the adder-subtractor circuit of the third embodiment illustrated in FIG. 4, the first operand OP1 which is not inverted is supplied to the bit-by-bit XOR circuit 21A. Other than this, there is no difference between the adder-subtractor circuit of the third embodiment and the adder-subtractor circuit of the first embodiment.

In the addition operation, the control signal C is set to 0, so that the bit-by-bit XOR circuit 21A outputs a first arithmetic value obtained by performing a bit-by-bit XOR between the first operand OP1 and the second operand OP2. The carry generating circuit 22 generates carries having a value of 0 or 1 for each bit based on the first operand OP1 and the second operand OP2. The bit-by-bit XOR circuit 23 outputs the result of addition obtained by performing a bit-by-bit XOR between the first arithmetic value and the carries.

In the subtraction operation, the control signal C is set to 1, so that the bit-by-bit XOR circuit 21A outputs a first arithmetic value obtained by performing a bit-by-bit XOR between the first operand OP1 and the second operand OP2. The carry generating circuit 22 generates carries having a value of 0 or 1 for each bit based on the first inverted operand ~OP1 and the second operand OP2. The bit-by-bit XOR circuit 23 outputs the result of subtraction obtained by performing a bit-by-bit XOR between the first arithmetic value and the carries.

In the configuration of FIG. 4, when the operation of the bit-by-bit XOR circuit 21A and the operation of the bit-by-bit XOR circuit 23 are combined, the resulting operation is equivalent to the calculation of a bit-by-bit XOR between the carries, the first operand OP1, and the second operand OP2. However, on the side on which carries are generated, i.e., on the side on which the carry generating circuit 22 is situated, carries are generated between the first inverted operand ~OP1 and the second operand OP2.

As described above, the adder-subtractor circuit illustrated in FIG. 4 uses the carry generating circuit 22 to generate carries from the first inverted operand ~OP1 and the second operand OP2. The XOR circuit (21A+23) then performs a bit-by-bit XOR between the carries, the first operand OP1, and the second operand OP2. Accordingly, as in the first embodiment, the subtraction result of "OP1-OP2" is duly output.

In the adder-subtractor circuit of the third embodiment illustrated in FIG. 4, the inverting circuit 30 is moved to the first operand OP1 side as compared to the conventional adder-subtractor circuit illustrated in FIG. 1, in which the inverting circuit 11 is disposed on the second operand OP2 side. When the first operand OP1 side and the second operand OP2 side are compared in this configuration, the path delay is reduced on the second operand OP2 side, which is conventionally a critical path. Further, the adder-subtractor circuit of the first embodiment illustrated in FIG.

2 and the adder-subtractor circuit of the second embodiment illustrated in FIG. 3 have a bit-by-bit inversion performed on the side on which an XOR is performed, whereas such an inversion operation is non-existent in the adder-subtractor circuit of the third embodiment illustrated in FIG. 4. Accordingly, the adder-subtractor circuit of the third embodiment illustrated in FIG. 4 achieves a reduced path delay in the configuration in which an additional function is provided to perform a predetermined arithmetic operation for one of the two operands.

Figure 5:
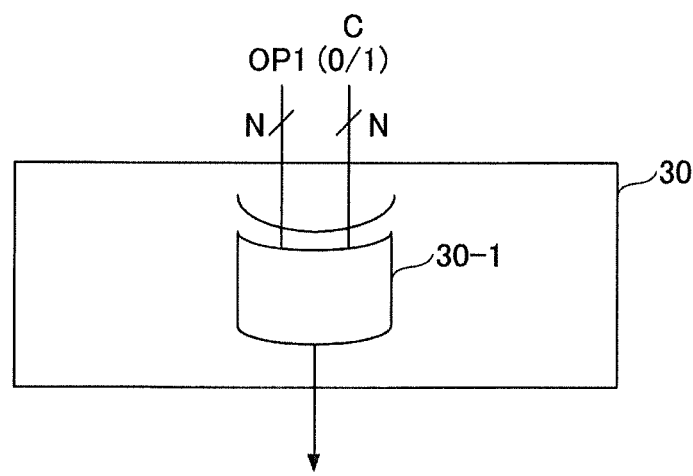
FIG. 5 is a diagram illustrating an example of the configuration of an inverting circuit.

FIG. 5 is a diagram illustrating an example of the configuration of the inverting circuit 30. The inverting circuit 30 illustrated in FIG. 5 includes an XOR circuit 30-1 for performing a bit-by-bit XOR between the first operand OP1 which is N bits long and N-bit data obtained by arranging at each of the N-bit positions the value of the control signal C that is set to either "0" or "1". The XOR circuit 30-1 may be implemented by aligning N two-input XOR gates in parallel.

Figure 6:
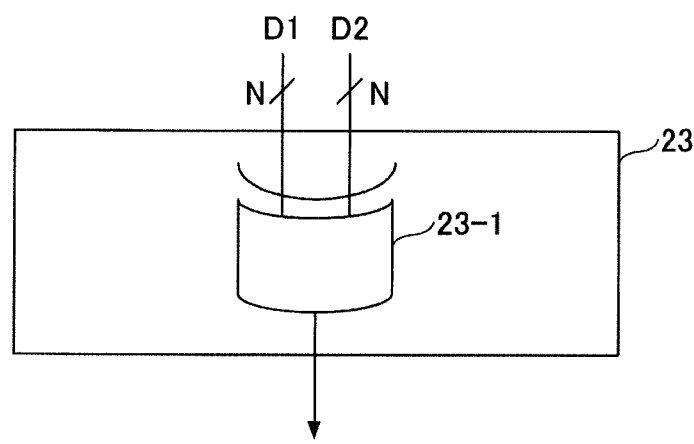
FIG. 6 is a diagram illustrating an example of the configuration of a bit-by-bit XOR circuit.

FIG. 6 is a diagram illustrating an example of the configuration of a bit-by-bit XOR circuit 23. The bit-by-bit XOR circuit 21A may have the same configuration as the bit-by-bit XOR circuit 23 illustrated in FIG. 6. The bit-by-bit XOR circuit 23 illustrated in FIG. 6 includes an XOR circuit 23-1 for performing a bit-by-bit XOR between first data D1 which is N bits long and second data D2 which is N bits long. The XOR circuit 23-1 may be implemented by aligning N two-input XOR gates in parallel.

Figure 7:
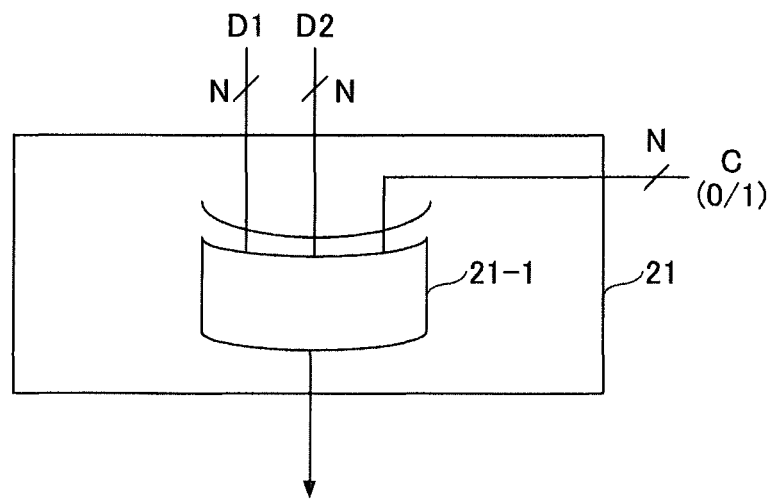
FIG. 7 is a diagram illustrating an example of the configuration of a bit-by-bit XOR and inverting circuit.

FIG. 7 is a diagram illustrating an example of the configuration of the bit-by-bit XOR and inverting circuit 21. The bit-by-bit XOR and inverting circuit 23A may have the same configuration as the bit-by-bit XOR and inverting circuit 21 illustrated in FIG. 7. The bit-by-bit XOR and inverting circuit 21 includes an XOR circuit 21-1 for performing a bit-by-bit XOR operation between first data D1 which is N bits long, second data D2 which is N bits long, and N-bit data obtained by arranging at each of the N-bit positions the value of the control signal C that is set to either "0" or "1". The XOR circuit 21-1 may be implemented by aligning N three-input XOR gates in parallel.

Figure 8:
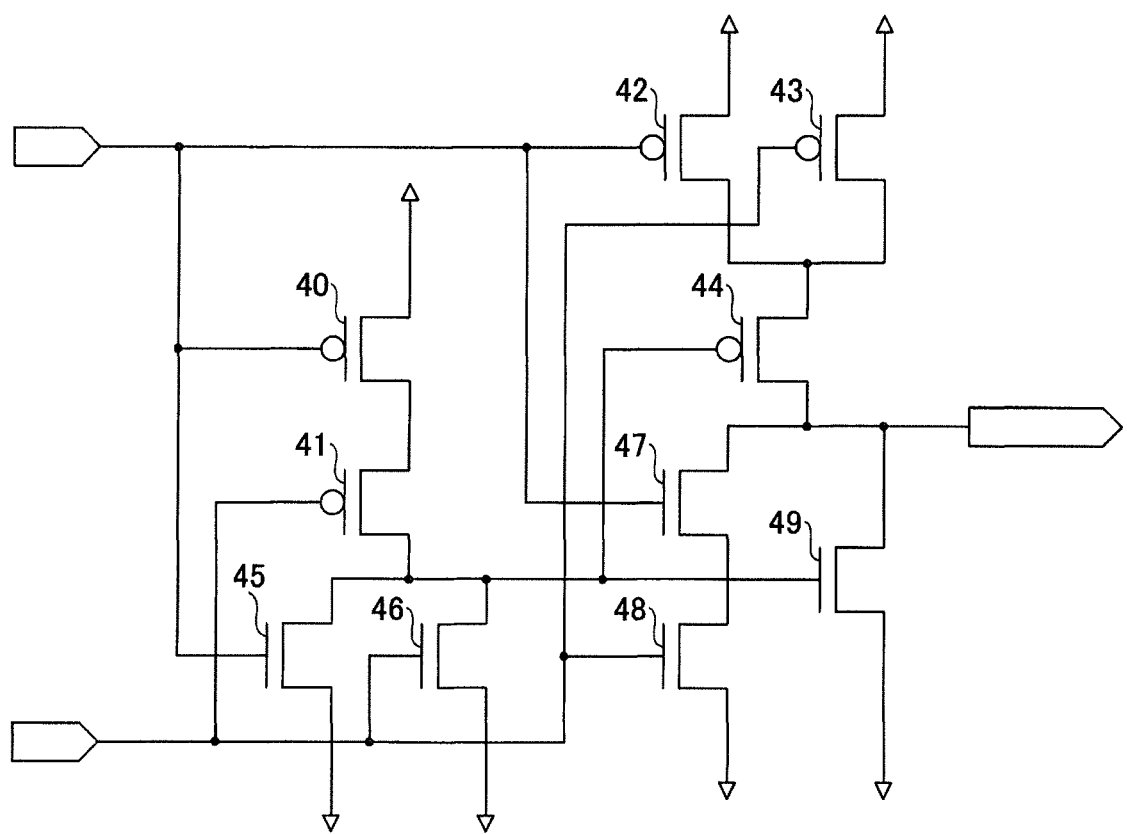
FIG. 8 is a diagram illustrating an example of the circuit configuration of a two-input XOR gate.

FIG. 8 is a diagram illustrating an example of the circuit configuration of a two-input XOR gate. The XOR gate having two inputs illustrated in FIG. 8 may be used as the XOR circuit 30-1 illustrated in FIG. 5 or the XOR circuit 23-1 illustrated in FIG. 6. The two-input XOR gate illustrated in FIG. 8 includes PMOS transistors 40-44 and NMOS transistors 45-49. In this two-input XOR gate, the number of transistor stages in the longest path from input to output is two.

Figure 9:
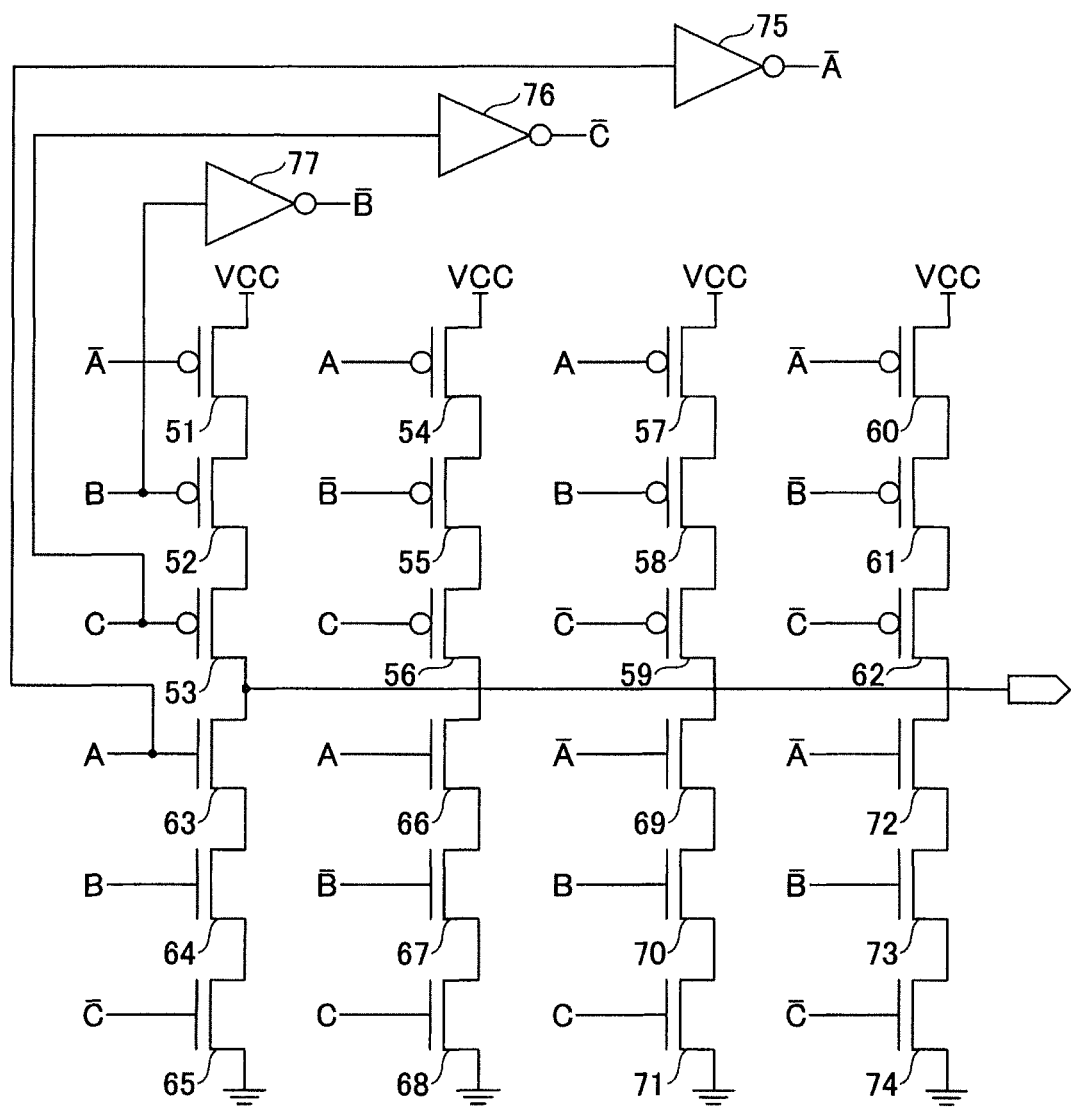
FIG. 9 is a diagram illustrating an example of the circuit configuration of a three-input XOR gate.

FIG. 9 is a diagram illustrating an example of the circuit configuration of an XOR gate with three inputs. The three-input XOR gate illustrated in FIG. 9 may be be used as the XOR circuit 21-1 illustrated in FIG. 7. The three-input XOR gate illustrated in FIG. 9 includes PMOS transistors 51-62, NMOS transistors 63-74, and inverters 75-77. Since each of the inverters 75-77 may be implemented as a series-connected NMOS transistor and PMOS transistor, the number of transistor stages is one. Accordingly, in the three-input XOR gate illustrated in FIG. 9, the number of transistor stages in the longest path from input to output is two.

For both the two-input XOR gate illustrated in FIG. 8 and the three-input XOR gate illustrated in FIG. 9, the number of transistor stages from input to output is two, and a delay length as measured in terms of the number of transistor stages is the same. Use of the XOR gate having the configuration illustrated in FIG. 9 allows an inversion operation to be incorporated in the bit-by-bit XOR and inverting circuit 23A of the adder-subtractor circuit illustrated in FIG. 3 without increasing the delay time.

Figure 10:
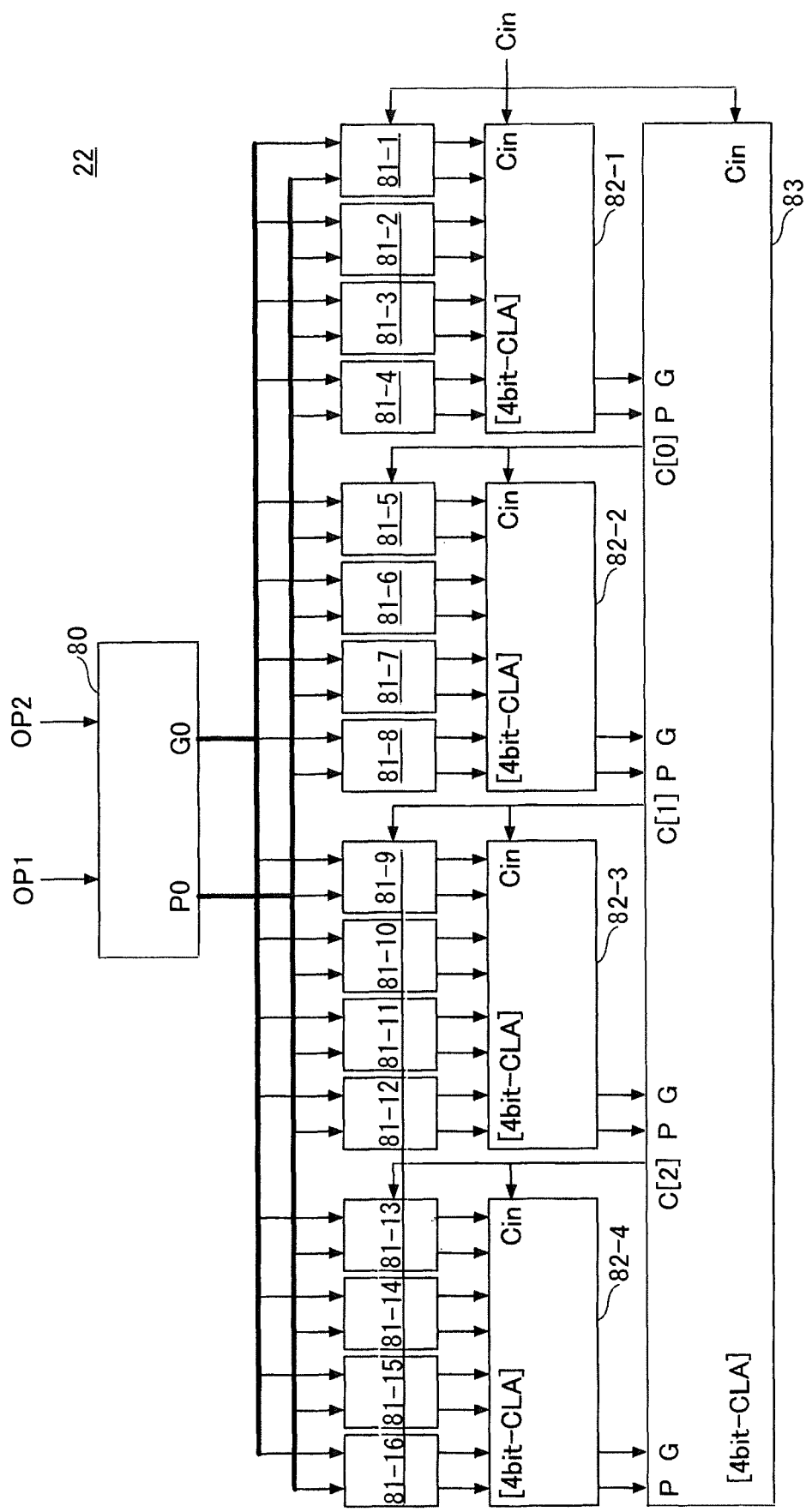
FIG. 10 is a diagram illustrating an example of the configuration of a carry generating circuit.

FIG. 10 is a diagram illustrating an example of the configuration of a carry generating circuit 22. The carry generating circuit 22 illustrated in FIG. 10 includes a PG generating circuit 80, 4-bit CLAs 81-1 to 81-16, 4-bit CLAs 82-1 to 82-4, and a 4-bit CLA 83. In the carry generating circuit 22 illustrated in FIG. 10, each of the first operand OP1 and the second operand OP2, which are input data, is 64 bits long, and the carry, which is output data, is 64 bits long. As was previously described, the inputs into the carry generating circuit 22 are the first operand OP1 and the second operand OP2 in the case of the addition operation, and are the first inverted operand ~OP1 and the second operand OP2 in the case of the subtraction operation. For convenience, FIG. 10 illustrates one of the inputs as the first operand OP1.

Figure 11:
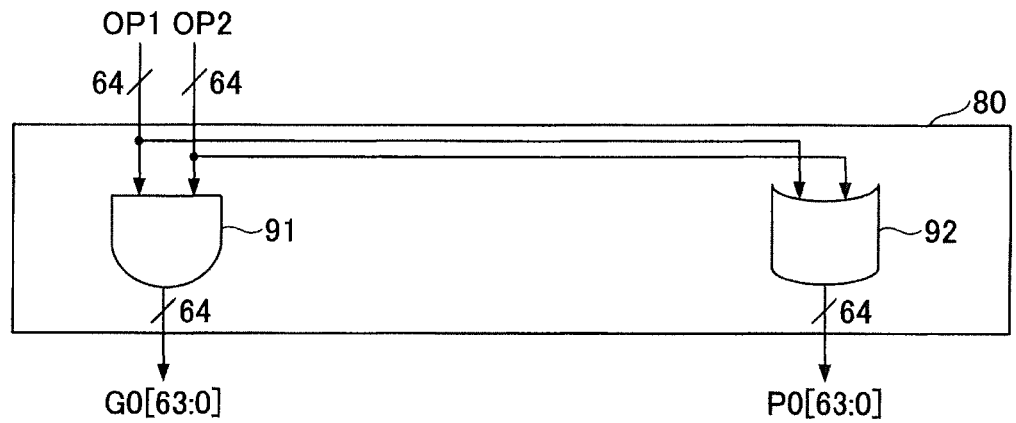
FIG. 11 is a diagram illustrating an example of the configuration of a PG generation circuit illustrated in FIG. 10.

FIG. 11 is a diagram illustrating an example of the configuration of the PG generating circuit 80 illustrated in FIG. 10. The PG generating circuit 80 illustrated in FIG. 11 includes an AND circuit 91 and an XOR circuit 92. The AND circuit 91 performs a bit-by-bit AND between the first operand OP1, which is 64 bits long, and the second operand OP2, which is 64 bits long. The AND circuit 91 may be implemented by aligning 64 two-input AND gates in parallel. The XOR circuit 92 performs a bit-by-bit XOR between the first operand OP1, which is 64 bits long, and the second operand OP2, which is 64 bits long. The XOR circuit 92 may be implemented by aligning 64 two-input XOR gates in parallel. The PG generating circuit 80 outputs a 64-bit G signal G0 and a 64-bit P signal P0.

Figure 12:
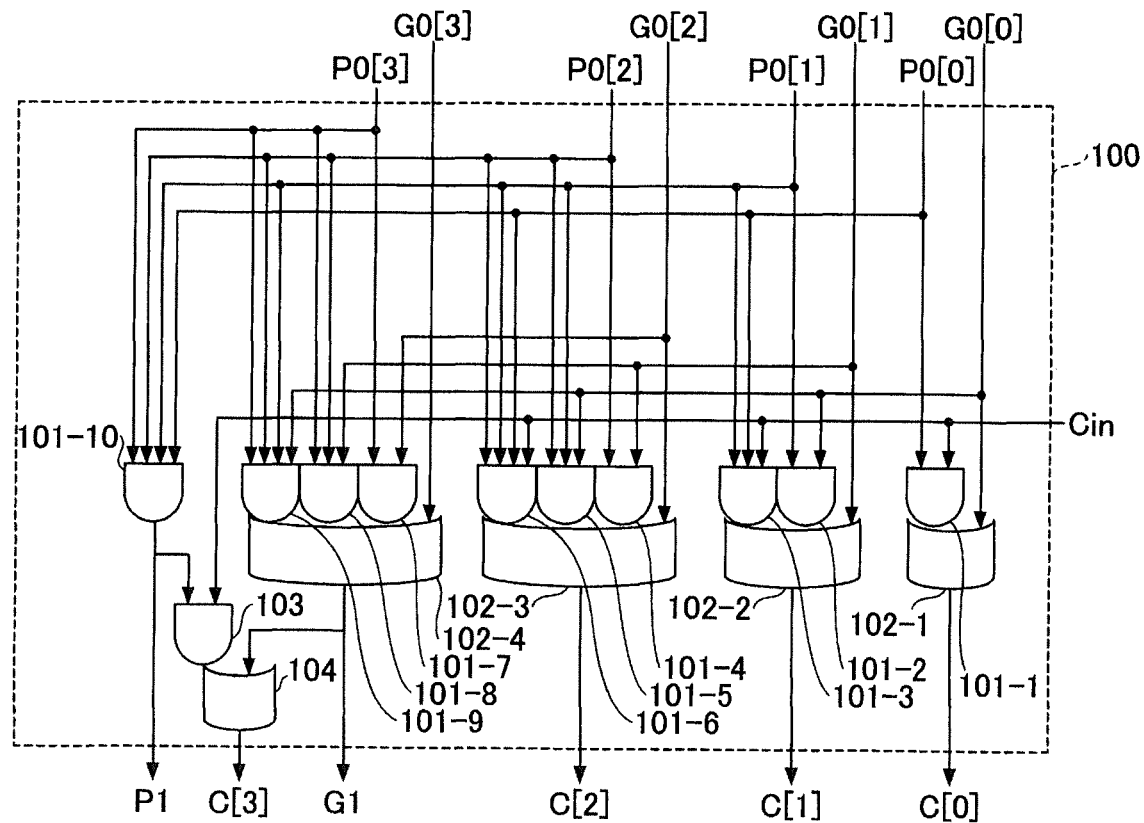
FIG. 12 is a diagram illustrating an example of the configuration of a 4-bit CLA.

FIG. 12 is a diagram illustrating an example of the configuration of a 4-bit CLA. A 4-bit CLA 100 illustrated in FIG. 12 may be used as each of the 4-bit CLAs 81-1 to 81-16, the 4-bit CLAs 82-1 to 82-4, and the 4-bit CLA 83 illustrated in FIG. 10. The 4-bit CLA 100 illustrated herein is a carry generating portion of a 4-bit CLA (Carry Look-Ahead Adder).

The 4-bit CLA 100 includes AND gates 101-1 to 101-10, OR gates 102-1 to 102-4, an AND gate 103, and an OR gate 104. In the example illustrated in FIG. 12, the four lower bits of the 64-bit P signal P0[63:0] and the 64-bit G signal G0[63:0] generated by the PG generating circuit 80, i.e., P0[3:0] and G0[3:0], respectively, are illustrated as input signals. Those input signals are the input signals into the 4-bit CLA 81-1 when the 4-bit CLA 100 is used as the 4-bit CLA 81-1 in the configuration of FIG. 10. In FIG. 12, P0[3:0] is illustrated as P0[3] to P0[0], and G0[3:0] is illustrated as G0[3] to G0[0]. In this notation, Z[X:Y] refers to the Y-th bit of data Z to the X-th bit of data Z (X>Y), and Z[X] refers to the X-th bit of data Z. An input carry Cin is applied to the 4-bit CLA 100.

The 4-bit CLA 100 allows the 4-bit carries C[0] to C[3] to be computed in parallel substantially concurrently. Extending the circuit configuration implemented as the 4-bit CLA 100 to a 64-bit configuration allows 64-bit carries to be calculated in parallel substantially concurrently. However, since a large number of gates are required in such a configuration, the carry generating circuit 22 illustrated in FIG. 10 is configured such that a plurality of 4-bit CLAs 100 are combined to generate carries in the units of 4 bits. The P1 signal and the G1 signal are output from the 4-bit CLA 100.

Figure 13:
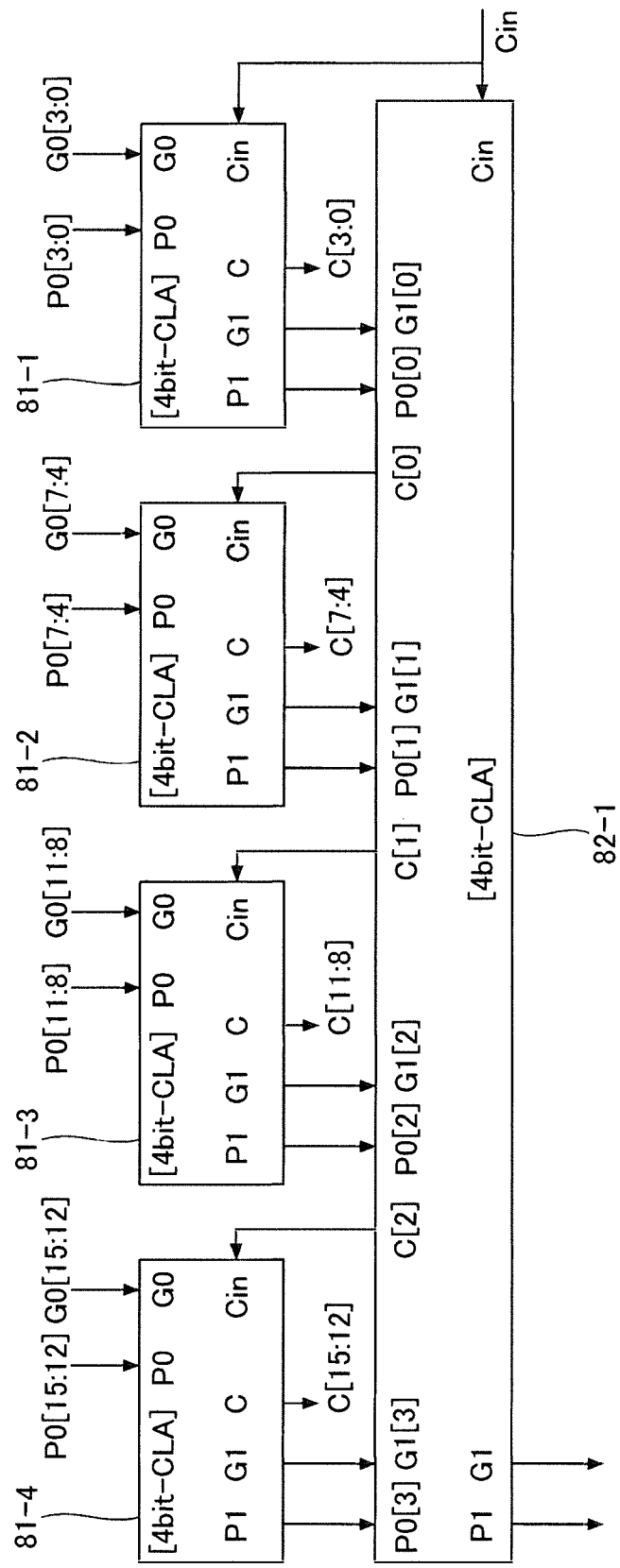
FIG. 13 is a enlarged partial view of the carry generating circuit illustrated in FIG. 10.

FIG. 13 is a diagram illustrating an enlarged and detailed configuration of a portion of the carry generating circuit 22 illustrated in FIG. 10. FIG. 13 illustrates the details of connections between the 4-bit CLAs 81-1 to 81-4 and the 4-bit CLA 82-1 illustrated in FIG. 10. The 4-bit CLAs 81-1 to 81-4 receive P0[3:0] and G0[3:0], P0[7:4] and G0[7:4], P0[11:8] and G0[11:8], and P0[15:12] and G0[15:12], respectively. The four P1 and G1 signals output by the four 4-bit CLAs 81-1 to 81-4 are input into the 4-bit CLA 82-1 as P0[0] and G0[0], P0[1] and G0[1], P0[2] and G0[2], P0[3] and G0[3]. In addition, the input carry Cin is applied to the 4-bit CLA 81-1 and 82-1.

The same configuration of connections as illustrated in FIG. 13 is applied to the connections between the 4-bit CLAs 81-5 to 81-8 and the 4-bit CLA 82-2 illustrated in FIG. 10. The same applies to the connections between the 4-bit CLAs 81-9 to 81-12 and the 4-bit CLA 82-3 illustrated in FIG. 10 as well as to the connections between the 4-bit CLAs 81-13 to 81-16 and the 4-bit CLA 82-4.

In the carry generating circuit 22 having the configuration illustrated in FIGS. 10 through 13, the 64-bit carries C[64:0] are output from the 4-bit CLAs 81-1 through 81-16. The carries C[64:0] are then supplied to the bit-by-bit XOR circuit 23 or to the bit-by-bit XOR and inverting circuit 23A situated at the next stage illustrated in FIGS. 2 through 4.

In the case of the carry generating circuit 22 illustrated in FIG. 10, the path length from input to output is equivalent to 17 stages, as measured in terms of the number of gate stages. Accordingly, when the bit-by-bit XOR and inverting circuit 21 of the first embodiment illustrated in FIG. 2 is implemented as 17 or fewer stages, the amount of delay from the input to the output of the adder-subtractor 20 does not increase due to the insertion of the inverting operation of the bit-by-bit XOR and inverting circuit 21. For example, two-input XOR gates may be sequentially connected in two stages, such that a bit-by-bit XOR is performed by the first two-input XOR gate and an inversion is performed by the second two-input XOR gate. Even with such a configuration, the entire delay is not affected by the provision of the inversion operation.

In the configuration of the carry generating circuit 22 illustrated in FIG. 10, the XOR circuit 92 of the PG generating circuit 80 as illustrated in FIG. 11 performs a bit-by-bit XOR on the first operand OP1 (or the first inverted operand ~OP1) and the second operand OP2. This bit-by-bit XOR operation is the same as the bit-by-bit XOR operation performed by the bit-by-bit XOR and inverting circuit 21 in FIG. 2 and by the bit-by-bit XOR circuit 21A in FIG. 3. Accordingly, in the first embodiment illustrated in FIG. 2 and the second embodiment illustrated in FIG. 3, the XOR circuit 92 of the PG generating circuit 80 of the carry generating circuit 22 may be shared with the bit-by-bit XOR and inverting circuit 21 and the bit-by-bit XOR circuit 21A. In the fourth embodiment illustrated in FIG. 4, however, the XOR circuit 92 of the PG generating circuit 80 of the carry generating circuit 22 cannot be shared with the bit-by-bit XOR circuit 21A.

The adder-subtractor circuit of the first to third embodiments illustrated in FIGS. 2 through 4 uses a CLA (Carry Look-Ahead Adder). This is not a limiting example, and the adder-subtractor circuit may be configured to calculate carries by use of other methods. For example, a ripple carry adder may be configured such that carries are calculated from the first inverted operand ~OP1 and the second operand OP2, and the sum is obtained by performing a bit-by-bit XOR on the first operand OP1, the second operand OP2, and the carries. Similarly, a carry select adder or a carry skip adder may be used for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An adder-subtractor circuit for subtracting a second operand from a first operand, comprising:
   an inverting circuit configured to invert the first operand on a bit-by-bit basis to output a first inverted operand, the inverting circuit being disposed on a path of a minuend to invert the minuend rather than a subtrahend;
   a circuit having a function to perform a predetermined arithmetic operation and configured to output the second operand;
   a carry generating circuit configured to generate carries from the first inverted operand and the second operand; and
   an XOR circuit configured to produce a value of a bit-by-bit XOR of the carries, the first operand, and the second operand.

2. The adder-subtractor circuit as claimed in claim 1, wherein the XOR circuit includes:
   a circuit configured to calculate a first arithmetic value obtained by performing a bit-by-bit inversion on a result of performing a bit-by-bit XOR on the first inverted operand and the second operand; and
   a circuit configured to perform a bit-by-bit XOR on the first arithmetic value and the carries.

3. The adder-subtractor circuit as claimed in claim 1, wherein the XOR circuit includes:
   a circuit configured to calculate a first arithmetic value obtained by performing a bit-by-bit XOR on the first inverted operand and the second operand; and
   a circuit configured to perform a bit-by-bit inversion on a result of performing a bit-by-bit XOR on the first arithmetic value and the carries.

4. The adder-subtractor circuit as claimed in claim 1, wherein the XOR circuit includes:
   a circuit configured to calculate a first arithmetic value obtained by performing a bit-by-bit XOR on the first operand and the second operand; and
   a circuit configured to perform a bit-by-bit XOR on the first arithmetic value and the carries.

5. A method of subtracting a second operand from a first operand by controlling an adder-subtractor circuit, which is configured to perform addition or subtraction between the first operand and the second operand and has a function to perform a predetermined arithmetic operation on the second operand subject to the addition or subtraction, comprising:
   generating a first inverted operand by utilizing an inverting circuit to perform a bit-by-bit inversion on the first operand, the inverting circuit being disposed on a path of a minuend to invert the minuend rather than a subtrahend;
   generating carries from the first inverted operand and the second operand; and
   producing a value of a bit-by-bit XOR of the carries, the first operand, and the second operand.

* * * * *